(12) United States Patent
Park et al.

(10) Patent No.: US 11,034,379 B2
(45) Date of Patent: Jun. 15, 2021

(54) STEERING COLUMN APPARATUS FOR VEHICLES

(71) Applicants: Hyundai Motor Company, Seoul (KR); Kia Motors Corporation, Seoul (KR)

(72) Inventors: Joon-Mo Park, Seoul (KR); Byung-Woo Noh, Seoul (KR); Ji-Yong Yim, Hwaseong-si (KR); Beom-Soo Kim, Seoul (KR); Sang-Min Jo, Pyeongtaek-si (KR); Hyoung-Jun Ahn, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 16/372,232

(22) Filed: Apr. 1, 2019

(65) Prior Publication Data
US 2020/0047788 A1 Feb. 13, 2020

(30) Foreign Application Priority Data
Aug. 7, 2018 (KR) .................. 10-2018-0091837

(51) Int. Cl.
*B62D 1/19* (2006.01)
*B62D 1/187* (2006.01)

(52) U.S. Cl.
CPC ............. *B62D 1/195* (2013.01); *B62D 1/187* (2013.01)

(58) Field of Classification Search
CPC .......... B62D 1/195; B62D 1/187; B62D 1/19; B62D 1/16
See application file for complete search history.

(56) References Cited

U.S. PATENT DOCUMENTS

| | | | | |
|---|---|---|---|---|
| 5,609,364 A | * | 3/1997 | Fouquet ................. | B62D 1/195 280/777 |
| 8,984,984 B2 | * | 3/2015 | Yokota ................... | B62D 1/184 74/493 |
| 9,365,235 B2 | * | 6/2016 | Kingston-Jones ..... | B62D 1/195 |
| 2002/0020999 A1 | * | 2/2002 | Duval .................... | B62D 1/195 280/777 |
| 2004/0232685 A1 | * | 11/2004 | Gatti ...................... | B62D 1/195 280/777 |
| 2005/0247533 A1 | * | 11/2005 | Manwaring ............ | F16F 7/128 188/374 |
| 2006/0273569 A1 | * | 12/2006 | Manwaring ............ | B62D 1/195 280/777 |
| 2009/0218801 A1 | * | 9/2009 | Park ....................... | B62D 1/195 280/777 |
| 2012/0318092 A1 | * | 12/2012 | Kuroumaru ............ | B62D 1/195 74/492 |
| 2013/0205933 A1 | * | 8/2013 | Moriyama ............. | B62D 1/184 74/493 |

(Continued)

FOREIGN PATENT DOCUMENTS

KR 10-2012-0060975 A 6/2012

*Primary Examiner* — James A English
*Assistant Examiner* — Kurtis Nielson
(74) *Attorney, Agent, or Firm* — Morgan, Lewis & Bockius LLP

(57) ABSTRACT

A steering column apparatus configured for vehicles may include a housing assembly, and a support assembly configured to be coupled to one side of the housing assembly to serve to absorb a tilt and an impact.

16 Claims, 10 Drawing Sheets

(56) References Cited

U.S. PATENT DOCUMENTS

| | | | |
|---|---|---|---|
| 2014/0312603 A1* | 10/2014 | Hong | B62D 1/195 |
| | | | 280/777 |
| 2015/0239489 A1* | 8/2015 | Matsuno | B62D 1/189 |
| | | | 74/493 |
| 2016/0167694 A1* | 6/2016 | Hagiwara | B62D 1/192 |
| | | | 74/493 |
| 2016/0167695 A1* | 6/2016 | Hagiwara | B62D 1/192 |
| | | | 74/493 |
| 2018/0057038 A1* | 3/2018 | Kingston-Jones | B62D 1/195 |
| 2018/0208233 A1* | 7/2018 | Kwon | B62D 1/185 |
| 2018/0222519 A1* | 8/2018 | Johta | B62D 1/184 |
| 2018/0229757 A1* | 8/2018 | Yamaoka | B62D 1/189 |
| 2018/0251149 A1* | 9/2018 | Osawa | B62D 1/184 |
| 2018/0346011 A1* | 12/2018 | Hagiwara | B62D 1/184 |
| 2018/0354546 A1* | 12/2018 | Kreutz | B62D 1/195 |
| 2020/0189642 A1* | 6/2020 | Sugishita | B60R 25/021 |

* cited by examiner

FIG. 3A
FIG. 3B
FIG. 3C
FIG. 3D
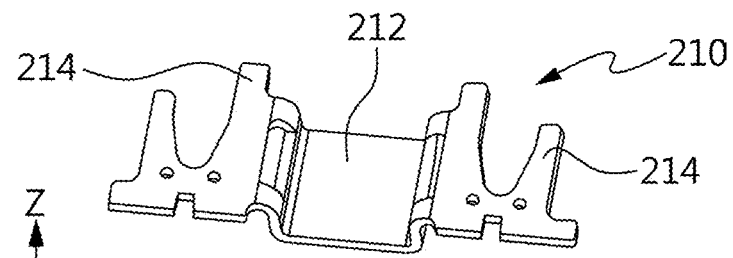
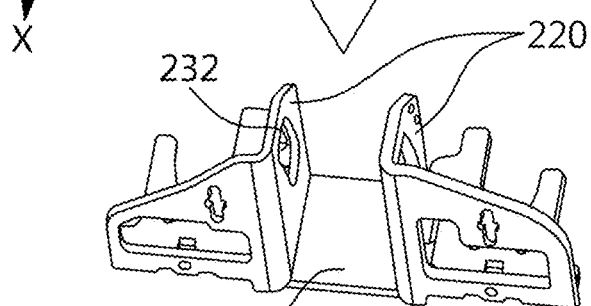
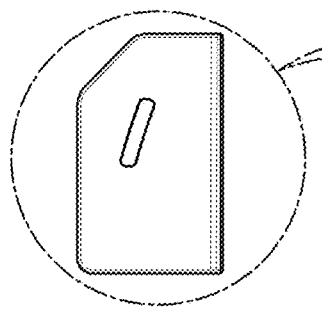
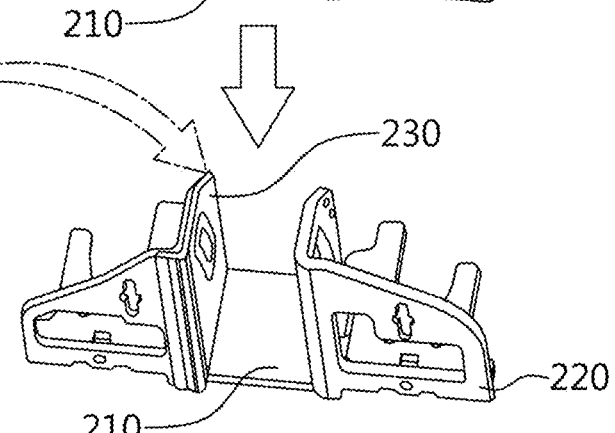
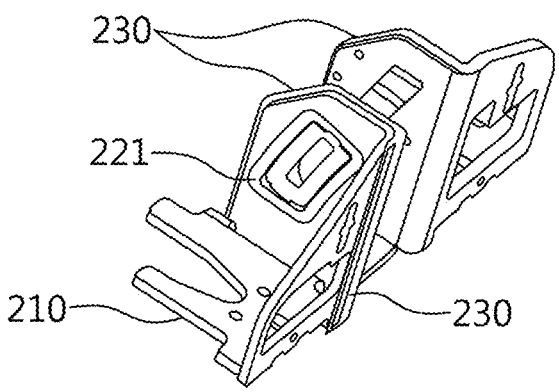

TOP VIEW

STEERING COLUMN APPARATUS FOR VEHICLES

CROSS-REFERENCE(S) TO RELATED APPLICATIONS

The present application claims priority to Korean Patent Application No. 10-2018-0091837, filed on Aug. 7, 2018, the entire contents of which is incorporated herein for all purposes by this reference.

BACKGROUND OF THE INVENTION

Field of the Invention

The present invention relates to a steering column apparatus for vehicles, and more particularly, to a steering column apparatus for vehicles having a structure capable of improving operability and safety.

Description of Related Art

A steering system is a device used to change a traveling direction of a vehicle and is operated by an operating mechanism including a steering wheel, a steering shaft, a column, and the like.

Generally, the steering column apparatus is an apparatus which is formed to enclose the column shaft which transfers a torque generated due to an operation of the steering wheel by a driver to a rack-pinion mechanism to support a rotation of the column shaft and is combined with a vehicle body through a bracket to fix a position of the column shaft.

The steering column apparatus may further include a tilt or telescope function for convenience of a driver, in which the tilt is to control a fixed angle of the steering wheel and the telescope has two hollow tubes inserted thereinto to be configured to be expanded or contracted in a direction of the column shaft and is configured for absorbing impact energy while the column shaft and the steering column collapse to mitigate the impact when a driver hits the steering wheel at the time of a vehicle crash.

The driver can smoothly manipulate the steering wheel by controlling a degree of projection or a tilt angle of the steering wheel according to his or her height or body shape through such functions.

Conventionally, an upper mounting bracket is moved, and a curling plate which is wound to absorb the impact is spread to obtain a collapsed load. However, when the curling plate which is wound is spread by being pressed in one direction and twisted, in the instant case, a load difference occurs, so that a problem of deterioration in safety arises.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a steering column apparatus configured for vehicles configured for improving operability by easily adjusting and fixing a fixed angle of a steering wheel and improving safety by uniformly managing a load to absorb an impact at the time of a vehicle crash.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a steering column apparatus configured for vehicles may include: a housing assembly; and a support assembly configured to be coupled to one side of the housing assembly to serve to absorb a tilt and an impact.

The housing assembly may include: a column housing; and a tube inserted into the column housing.

The column housing and the tube may have a hollow tube shape.

One side of the column housing may be provided with a coupling portion coupled to the support assembly.

The coupling portion may be provided with a linear slit.

The support assembly may include: an upper mounting plate; distance brackets configured to be coupled to left and right sides of the upper mounting plate, respectively; a hinged support panel configured to be coupled to one side of the distance bracket; dual folding curling plates configured to be coupled to both sides of the upper mounting plate, respectively; and a capsule configured to be located between the upper mounting plate and the dual folding curling plate.

The upper mounting plate may have a central portion provided with an indentation with respect to a top view.

The distance bracket may have a ¬-letter shape with respect to a plane.

The distance bracket may be punctured with a dual folding curling plate fastening hole to which a dual folding curling plate is fastened.

The hinged support panel may be a plate-like member having one side bent.

The hinged support panel may be provided with a tilt lever fastening slit to which a tilt lever is fastened.

The dual folding curling plate may be provided with an elongated slit.

The dual folding curling plate may be provided with a winding portion wound while being bent.

A flat portion of the dual folding curling plate may be punctured with a first bolt coupling hole.

A winding end portion of the dual folding curling plate may be punctured with a second bolt coupling hole.

The dual folding curling plate may be coupled to the upper mounting plate by penetrating through a dual folding curling plate fastening hole.

The capsule may be coupled to an upper mounting plate to be positioned on upper and lower surfaces of the upper mounting plate.

In accordance with various exemplary embodiments of the present invention, there is provided a vehicle mounted with a steering column apparatus configured for vehicles including a housing assembly and a support assembly configured to be coupled to one side of the housing assembly to serve to absorb a tilt and an impact.

According to an exemplary embodiment of the present invention, the steering column apparatus configured for vehicles can improve the operability by easily adjusting and fixing the fixed angle of the steering wheel and improving the safety by uniformly managing the load to absorb the impact at the time of the vehicle crash and uniformly managing the load even when the twist occurs.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3A, FIG. 3B, FIG. 3C and FIG. 3D are partially assembled schematic views of the support assembly of the steering column apparatus for vehicles according to the exemplary embodiment of the present invention.

Figure 1:
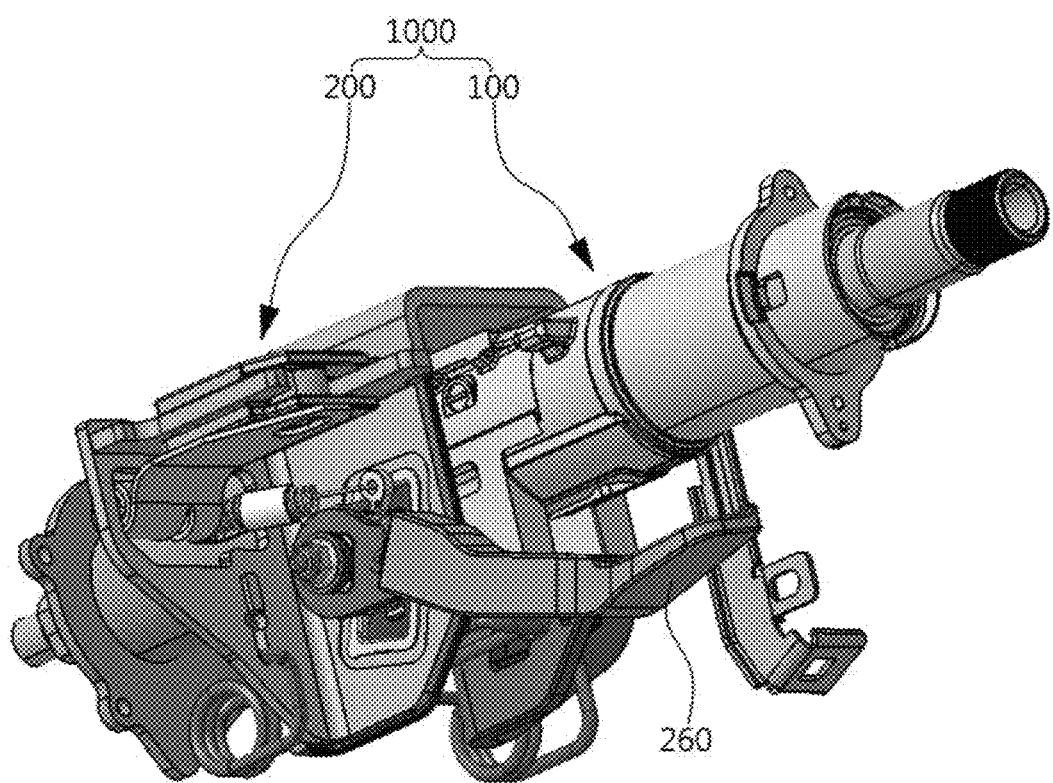
FIG. 1 is a schematic view of a steering column apparatus for vehicles according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments described below are provided so that those skilled in the art can easily understand the technical spirit of the present invention, and therefore the present invention is not limited thereto. Furthermore, matters described in the accompanying drawings may be different from those actually implemented by the schematic drawings to easily describe the exemplary embodiments of the present invention.

It is to be understood that when any component is referred to as being connected to or coupled to another component, it may be directly connected to or coupled directly to another component or be connected to or coupled to another component with the other component intervening therebetween.

The "connection" used herein refers to a direction connection or an indirect connection between one member and other members, and may refer to all physical connections such as adhesion, attachment, fastening, joining, and bonding.

Also, expressions such as 'first and second' are used to distinguish a plurality of components, and do not limit an order or other features among components.

Singular forms are intended to include plural forms unless the context clearly indicates otherwise. It may be interpreted that terms "include", "have", or the like, specify the presence of features, numerals, steps, operations, components, parts mentioned in the present specification, or a combination thereof, but do not preclude the addition of one or more other features, numerals, steps, operations, components, parts, or a combination thereof.

FIG. 1 is a schematic view of a steering column apparatus configured for vehicles according to an exemplary embodiment of the present invention.

Referring to FIG. 1, a steering column apparatus 1000 for vehicles according to an exemplary embodiment of the present invention is configured to include a housing assembly 100 and a support assembly 200 coupled to one side of the housing assembly 100 to serve to absorb a tilt and an impact.

Furthermore, the steering column apparatus 1000 for vehicles is configured so that a tilt lever portion 260 is coupled to one side of the support assembly 200 which is coupled to the housing assembly 100.

Figure 2A:
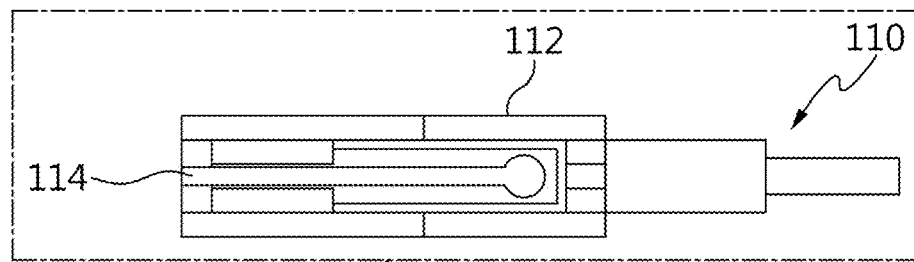
FIG. 2A and FIG. 2B are partially assembled schematic views of a support assembly and a housing assembly of the steering column apparatus for vehicles according to the exemplary embodiment of the present invention.
Figure 2B:
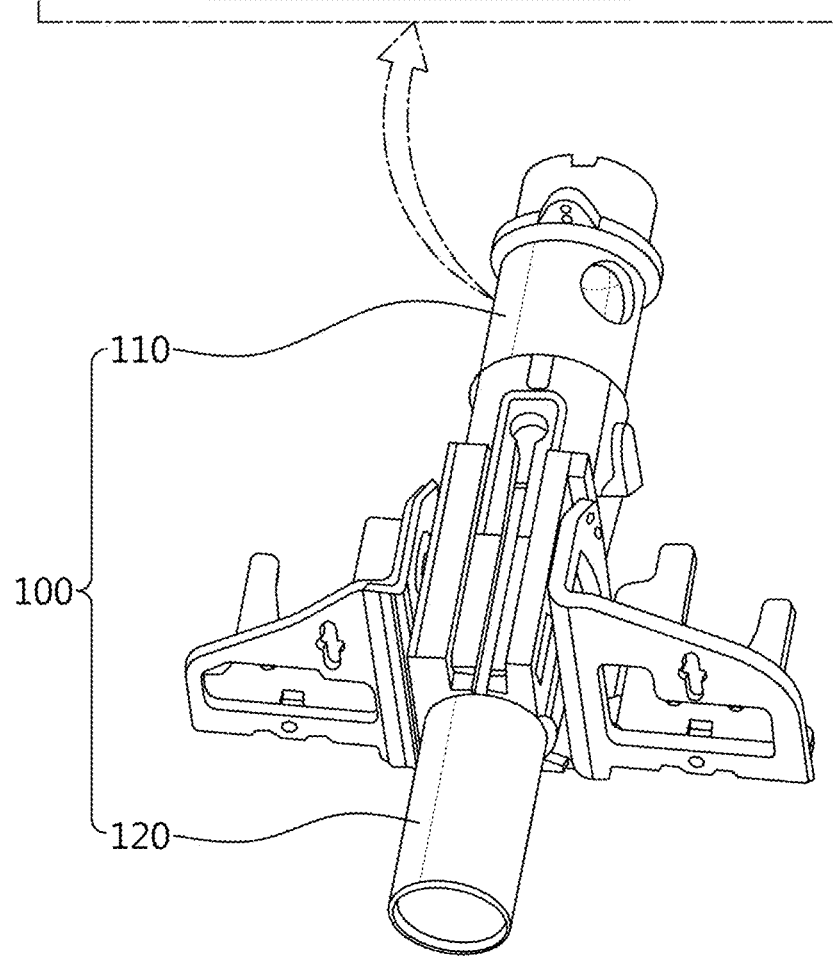

FIG. 2A and FIG. 2B are partially assembled schematic views of a support assembly and a housing assembly of the steering column apparatus configured for vehicles according to the exemplary embodiment of the present invention.

Referring to FIG. 2A and FIG. 2B, the housing assembly 100 is configured to include a column housing 110 and a tube 120 inserted into the column housing 110.

In an exemplary embodiment of the present invention, the column housing 110 and the tube 120 preferably have a hollow tube shape, and one side of the column housing 110 is provided with a coupling portion 112 which is coupled to the support assembly 200 (FIG. 1) and the coupling portion 112 is provided with a linear slit 114.

Figure 4:
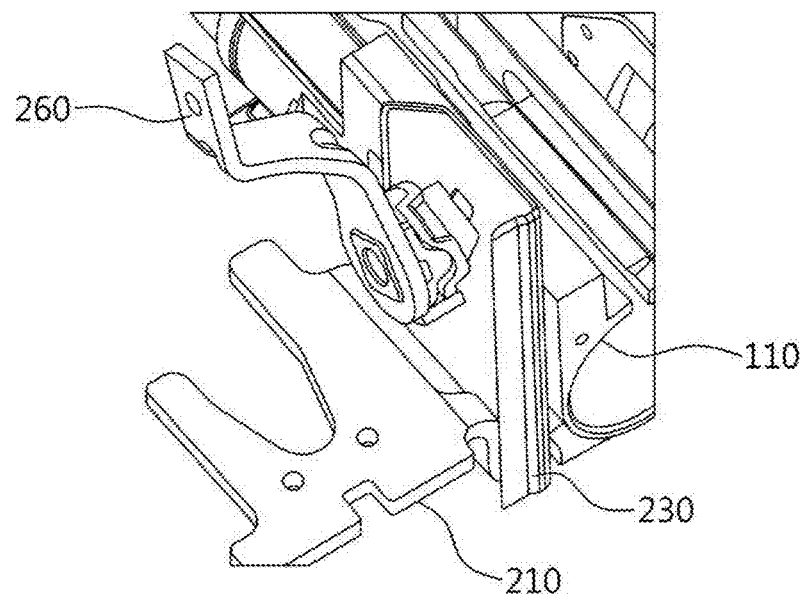
FIG. 4 is a partially enlarged schematic view of the steering column apparatus for vehicles according to the exemplary embodiment of the present invention.
Figure 5:
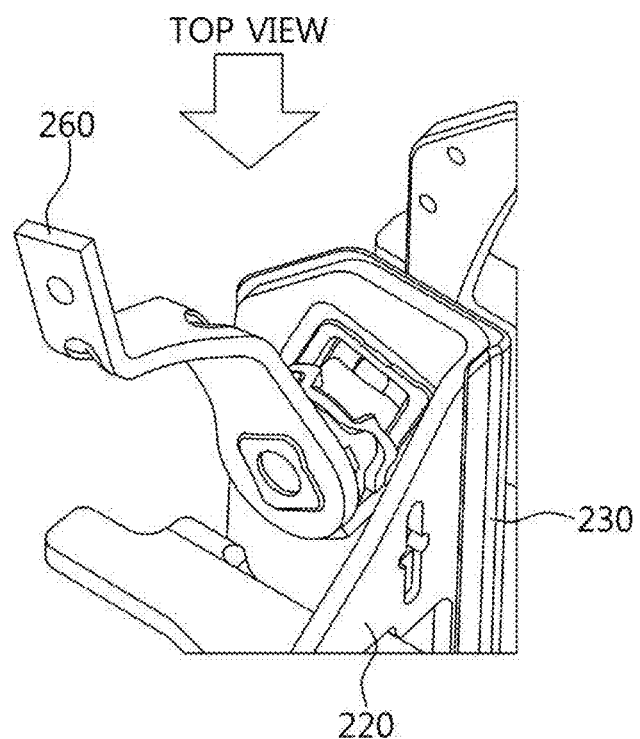
FIG. 5 is a partially enlarged schematic view of a distance bracket of the steering column apparatus for vehicles according to the exemplary embodiment of the present invention of FIG. 4.
Figure 6A:
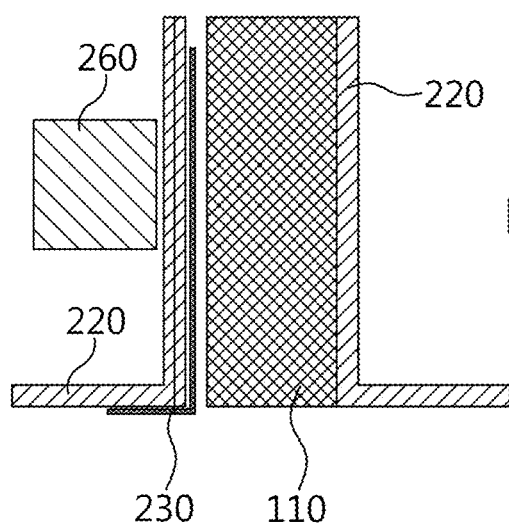
FIG. 6A and FIG. 6B are schematic diagrams showing an operation example of a tilt lever in the steering column apparatus for vehicles according to the exemplary embodiment of the present invention of FIG. 5.
Figure 6B:
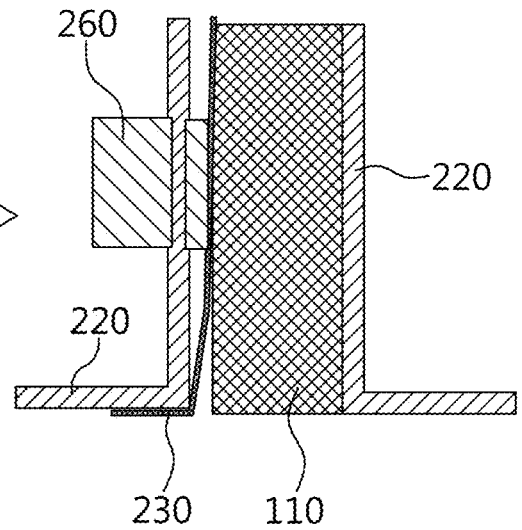

FIG. 3A, FIG. 3B, FIG. 3C and FIG. 3D are partially assembled schematic views of the support assembly of the steering column apparatus for vehicles according to the exemplary embodiment of the present invention, FIG. 4 is a partially enlarged schematic view of the steering column apparatus for vehicles according to the exemplary embodiment of the present invention, FIG. 5 is a partially enlarged schematic view of a distance bracket of the steering column apparatus for vehicles according to the exemplary embodiment of the present invention of FIG. 4, and FIG. 6A and FIG. 6B is a schematic diagram showing an operation example of a tilt lever in the steering column apparatus for vehicles according to the exemplary embodiment of the present invention of FIG. 5.

Referring to FIG. 3A, FIG. 3B, FIG. 3C and FIG. 3D, FIG. 4, FIG. 5 and FIG. 6A and FIG. 6B, there is shown a partial assembly view of a support assembly of the steering column apparatus for vehicles. The support assembly 200 (FIG. 1) is configured to include an upper mounting plate 210, distance brackets 220 coupled to left and right sides of the upper mounting plate 210, respectively, a hinged support panel 230 coupled to one side of the distance bracket 220, dual folding curling plates coupled to both sides of the upper mounting plate 210, respectively, and a capsule located between the upper mounting plate 210 and the dual folding curling plate.

In an exemplary embodiment of the present invention, the upper mounting plate 210 has an indentation 212 formed at a central portion with reference to a top view, that is, an X-axis direction thereof.

The distance brackets 220 have a ¬-letter shape respect to a plane, that is, a Z-axis direction thereof, and are each welded to both sides of the indentation 212 of the upper mounting plate 210. A tilt lever fastening hole 221 is punctured on the distance bracket 220 on the one side thereof.

Furthermore, the hinged support panel 230 is a plate-like member having one side bent, and the hinged support panel 230 is provided with a tilt lever fastening slit 232 with which a tilt lever (FIG. 1) 260 is fastened.

According to an exemplary embodiment of the present invention, the hinged support panel 230 is welded to one side of the distance bracket 220 positioned on the side of the indentation 212 of the upper mounting plate 210.

In an exemplary embodiment of the present invention, the tilt lever 260 (FIG. 1) is coupled to the hinged support panel 230 on the opposite side of the indentation 212 of the upper mounting plate 210, and the tilt lever 260 (FIG. 1) is supported on housing 100 by pressing the hinged support panel 230 toward the housing 110 side when the tilter lever 260 (FIG. 1) turns from an unlocked state to a locked state when viewed from a plane.

Figure 7A:
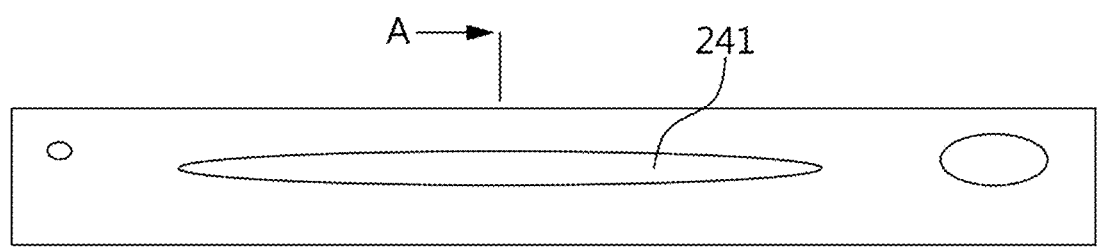
FIG. 7A and FIG. 7B are schematic views of a winding dual folding curling plate of the steering column apparatus for vehicles according to the exemplary embodiment of the present invention.
Figure 7B:
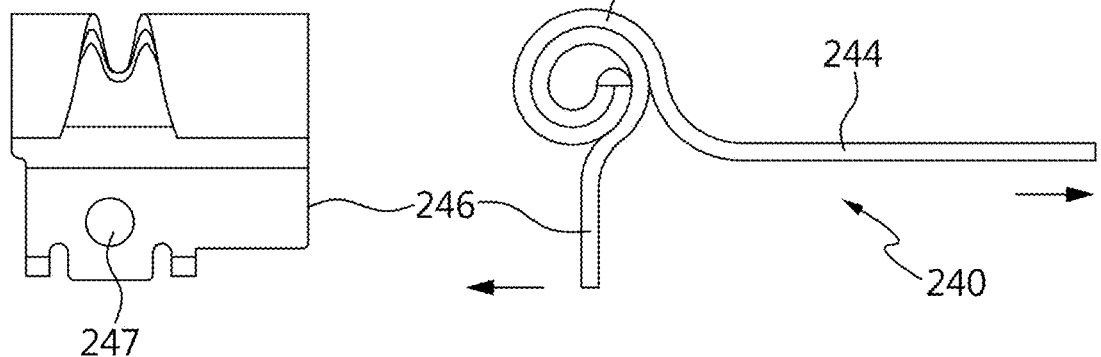
Figure 8A:
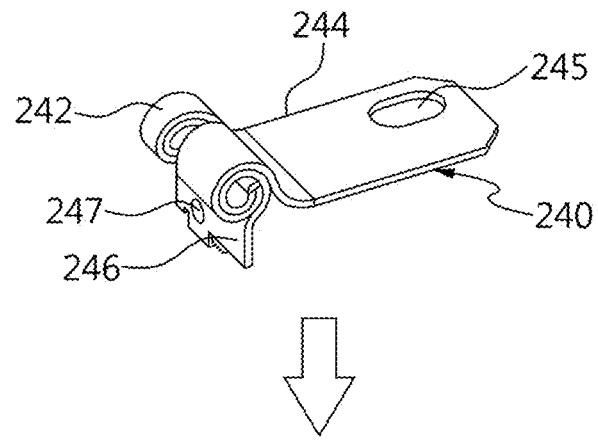
FIG. 8A, FIG. 8B and FIG. 8C are partially assembled schematic views of the dual folding curling plate of the steering column apparatus for vehicles according to the exemplary embodiment of the present invention.
Figure 8B:
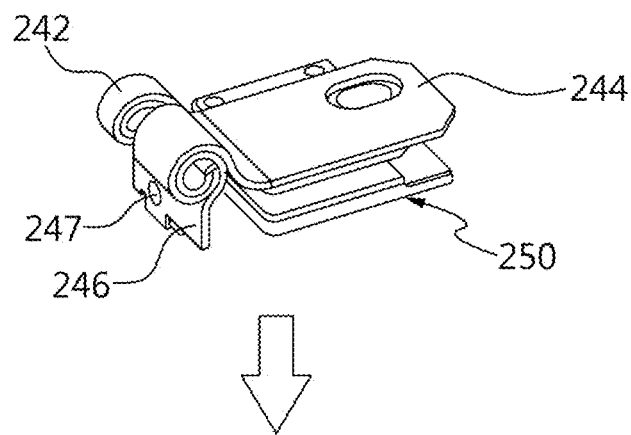
Figure 8C:
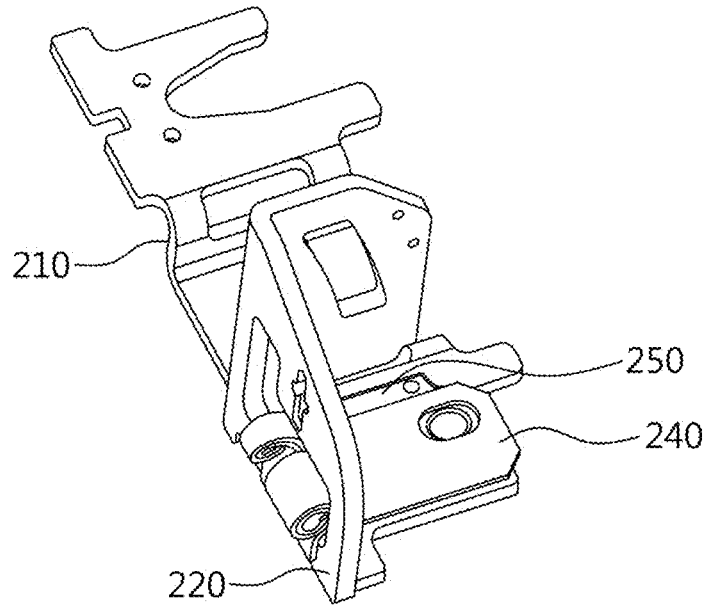
Figure 9:
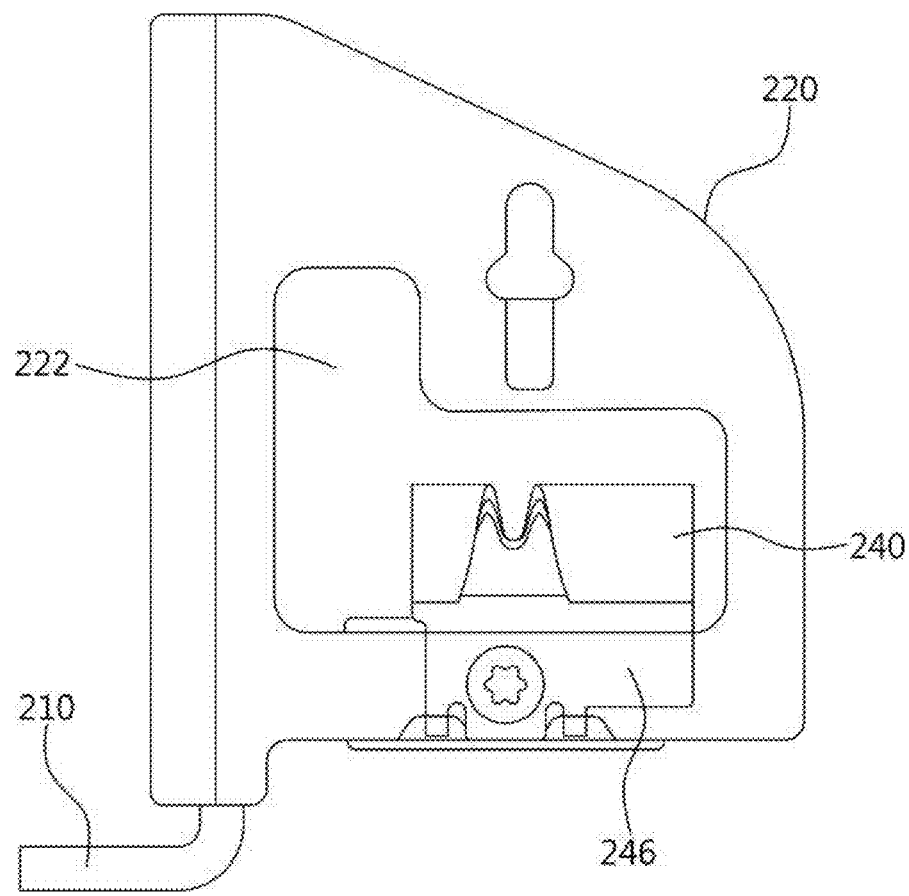
FIG. 9 is a bottom schematic view of a coupled portion of the dual folding curling plate of the steering column apparatus for vehicles according to the exemplary embodiment of the present invention of FIG. 8A, FIG. 8B and FIG. 8C.

FIG. 7A and FIG. 7B is schematic views of a winding dual folding curling plate of the steering column apparatus for vehicles according to the exemplary embodiment of the present invention, FIG. 8A, FIG. 8B and FIG. 8C are partially assembled schematic views of the dual folding curling plate of the steering column apparatus for vehicles according to the exemplary embodiment of the present invention, and FIG. 9 is a bottom schematic view of a coupled portion of the dual folding curling plate of the steering column apparatus for vehicles according to the exemplary embodiment of the present invention of FIG. 8A, FIG. 8B and FIG. 8C.

Referring to FIGS. 7 to 9, the dual folding curling plate 240 is wound while being bent along the line A-A in the plate-like member, and a central portion thereof is provided with an elongated slit 241.

In an exemplary embodiment of the present invention, the dual folding curling plate 240 is provided with a winding portion 242 which is wound while being bent along the A-A line, a flat portion 244 of the dual folding curling plate 240 is punctured with a first bolt coupling hole 245, and a winding end portion 246 adjacent to the winding portion 242 is punctured with a second bolt coupling hole 247.

At the instant time, a capsule 250 is coupled to the upper mounting plate 210 to be positioned on upper and lower surfaces of the upper mounting plate 210, and the dual folding curling plate 240 is coupled to be positioned on the capsule 250.

The dual folding curling plate 240 is coupled to the upper mounting plate 210 through a dual folding curling plate fastening holes 222 of the distance bracket 220.

Furthermore, the second bolt coupling hole 247 of the dual folding curling plate 240 is coupled to the distance bracket 220 using the bolt.

Figure 10:
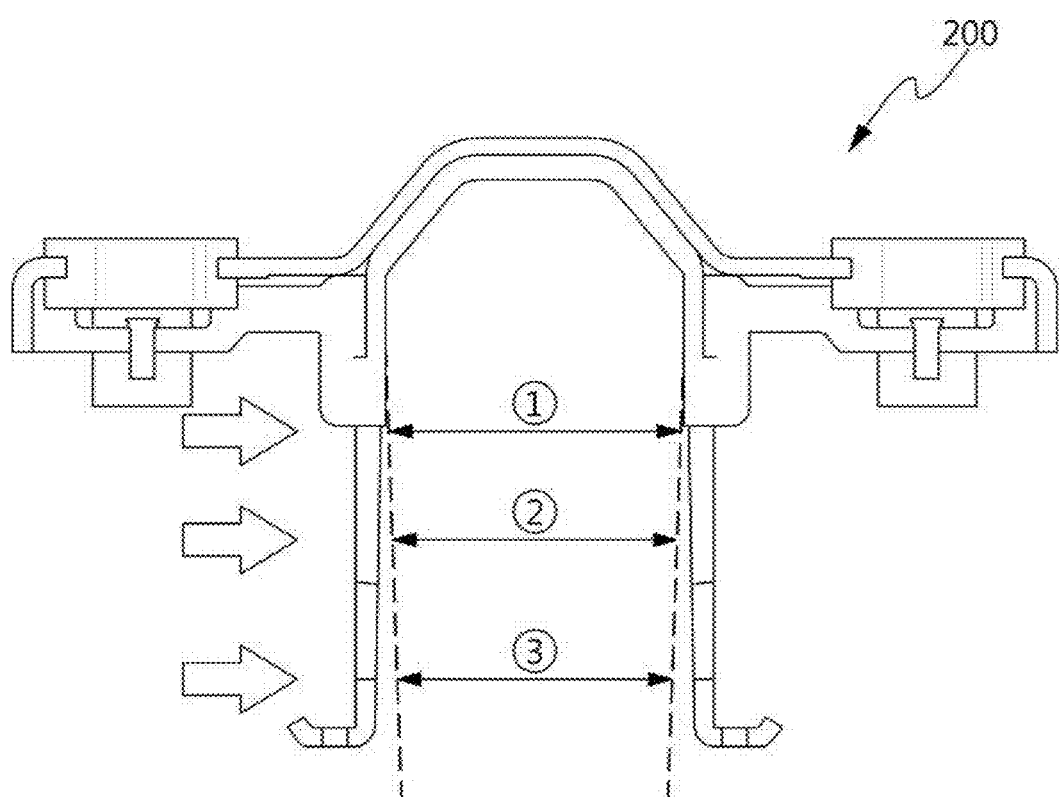
FIG. 10 is a schematic diagram showing an operation difference according to a tilt lever position of the steering column apparatus for vehicles according to the exemplary embodiment of the present invention.

FIG. 10 is a schematic diagram showing an operation difference according to a tilt lever position of the steering column apparatus configured for vehicles according to the exemplary embodiment of the present invention.

Referring to FIG. 10, it may be appreciated that an operation reference point of the tilt lever is different according to the position of the tilt lever coupled to the support assembly 200, and the operating force difference is generated while being narrowed as the order of ①, ②, and ③.

Figure 11:
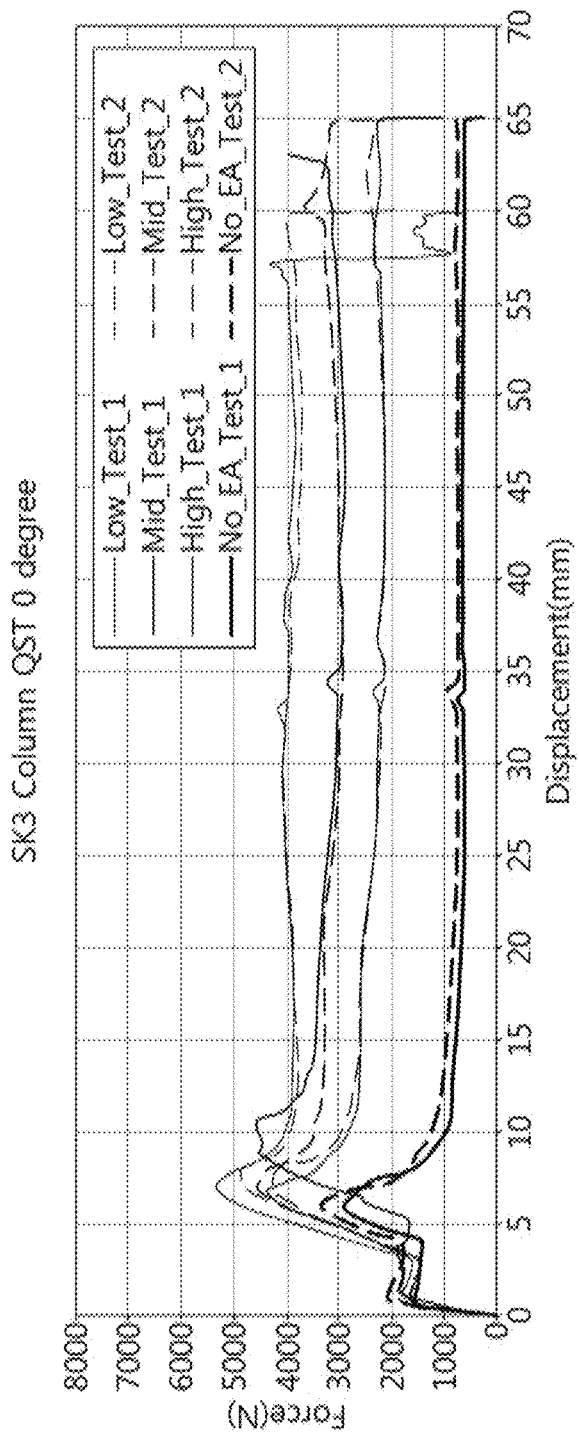
FIG. 11 is a graph illustrating results of a load test on the steering column apparatus for vehicles according to the exemplary embodiment of the present invention.

FIG. 11 is a graph illustrating results of a load test on the steering column apparatus configured for vehicles according to the exemplary embodiment of the present invention.

Referring to FIG. 11, it may be appreciated that if the dual folding curling plate turns from the wound state into the spread state, a pulling effect is uniformly exhibited from both sides of the entire displacement and the load management is performed.

Describing the operation relationship according to an exemplary embodiment of the present invention with reference to the drawings, the steering column apparatus 1000 for vehicles according to the exemplary embodiment of the present invention is configured to include the housing assembly 100 and the support assembly 200 coupled to one side of the housing assembly 100 and serving to absorb the tilt and the impact.

The housing assembly 100 includes the column housing 110 and the tube 120 inserted into the column housing 110. The column housing 110 has a hollow tube shape and has the tube 120 inserted thereinto and the tube 120 is coupled to the column housing 110 in the form in which one side thereof protrudes from the column housing 110 at a central portion thereof.

At the instant time, the coupling portion 112 is formed on one side of the column housing 110 to be coupled with the support assembly 200, and the coupling portion 112 is provided with the linear slit 114.

In the present structure, the support assembly 200 is configured to include the upper mounting plate 210, the distance brackets 220 coupled to the left and right sides of the upper mounting plate 210, respectively, the hinged support panel 230 coupled to one side of the distance bracket 220, the dual folding curling plates 240 coupled to both sides of the upper mounting plate 210 and the capsule 250 located between the upper mounting plate 210 and the dual folding curling plate 240. First of all, the distance brackets 220 are welded to both sides of the internal to the indentation 212 of the upper mounting plate 210.

The distance bracket 220 is coupled to the indentation 212 of the upper mounting plate 210 and the upper mounting plate 210 while enclosing the indentation 212 of the upper mounting plate 210 and the end portion of the upper mounting plate 210 in the ¬-letter shape with respect to a plane.

Next, the hinged support panel 230 is coupled to one surface of the distance bracket 220 positioned on the side of the indentation 212 of the upper mounting plate 210. The hinged support panel 230 is the plate-like member having one side bent, and the bent portion is welded to the distance bracket 220.

The hinged support panel 230 is provided with the tilt lever fastening slit 232 to which the tilt lever 260 is fastened, and even the distance bracket 220 corresponding thereto is punctured with the lever fastening holes 221.

To be continued, the dual folding curling plate coupling portions 214 on both sides of the indentation of the upper mounting plate 210 are coupled to the dual folding curling plate 240, and the capsule 250 is coupled to the upper mounting plate 210 to be positioned on the upper and lower surfaces of the upper mounting plate 210 and the bolt penetrates through the first bolt coupling hole 245 of the dual folding curling plate 240 to fasten the capsule 250 with the upper mounting plate 210.

The winding end portion 246 adjacent to the winding portion 242 of the dual folding curling plate 240 is punctured with the second bolt coupling hole 247, so that the bolt penetrates through the second bolt coupling hole 247 to be fastened with the distance bracket 220.

Furthermore, the tilt lever 260 is coupled through the tilt lever fastening slit 232 and the coupling portion 112 of the column housing 110 is coupled to be positioned at the indentation 212 of the upper mounting plate 210.

In the present structure, if the tilt lever 260 is locked and the hinged support panel 230 is pressed, the hinged support panel 230 is pressed and deformed toward the housing 110 side to cause a surface friction, forming the support structure.

Furthermore, if the dual folding curling plate 240 is spread in the wound state, the flat portion 244 and the winding end portion 246 are spread in an opposite direction to each other, so that even if the twist occurs, the load is uniformly managed.

Therefore, according to an exemplary embodiment of the present invention, the steering column apparatus configured for vehicles can make the operating force of the tilt lever small to reduce the deviations at each position, making it possible to configure the linear slit, and cannot require the operating force damping holes in the distance bracket to lower the operating force of the tilt lever, improving the rigidity.

Furthermore, it is possible to improve the operability by easily adjusting and fixing the fixed angle of the steering wheel, uniformly manage the load to absorb the impact at the time of the vehicle crash, and uniformly manage the load even when the twist occurs due to the elongated slit of the dual folding curling plate, improving the safety.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A steering column apparatus for a vehicle, the steering column apparatus comprising:
    a housing assembly including a column housing and a tube inserted into the column housing; and
    a support assembly coupled to a side of the housing assembly to absorb a tilt and an impact thereof,
    wherein the support assembly includes an upper mounting plate, distance brackets having an L-shape and coupled to predetermined sides of the upper mounting plate, respectively, a hinged support panel, an end of which is fixed to a side of the distance brackets, and dual folding curling plates coupled to a first side and a second side of the upper mounting plate, respectively, and
    wherein each of the dual folding curling plates includes a winding portion which is wound while being bent, a flat portion horizontally extending from the winding portion, and a winding end portion vertically extending from the winding portion, whereby when the dual folding curling plates are spread in the wound state due to an impact of a vehicle crash, the flat portion and the winding end portion are spread in an opposite direction to each other to uniformly manage a load by absorbing the impact even when a twist occurs.

2. The steering column apparatus for the vehicle of claim 1, wherein the column housing and the tube have a hollow tube shape.

3. The steering column apparatus for the vehicle of claim 1, wherein a side of the column housing is provided with a coupling portion coupled to the support assembly.

4. The steering column apparatus for the vehicle of claim 3, wherein the coupling portion is provided with a linear slit formed along a longitudinal direction of the coupling portion.

5. The steering column apparatus for the vehicle of claim 1, wherein the support assembly further includes:
    a capsule mounted between the upper mounting plate and the dual folding curling plates.

6. The steering column apparatus for the vehicle of claim 5, wherein the upper mounting plate has a central portion provided with an indentation.

7. The steering column apparatus for the vehicle of claim 6, wherein the distance brackets are connected to first and second sides of the indentation.

8. The steering column apparatus for the vehicle of claim 5, wherein each of the distance brackets is punctured with a dual folding curling plate fastening hole to which the dual folding curling plates are fastened.

9. The steering column apparatus for the vehicle of claim 5, wherein the hinged support panel is in a plate shape having a side bent.

10. The steering column apparatus for the vehicle of claim 5, wherein the hinged support panel is provided with a tilt lever fastening slit to which a tilt lever is fastened.

11. The steering column apparatus for the vehicle of claim 5, wherein the dual folding curling plates are provided with an elongated slit.

12. The steering column apparatus for the vehicle of claim 5, wherein the flat portion of the dual folding curling plates is punctured with a first bolt coupling hole.

13. The steering column apparatus for the vehicle of claim 5, wherein the winding end portion of the dual folding curling plates is punctured with a second bolt coupling hole for a fastening member to couple the winding end portion of the dual folding curling plates to the distance brackets.

14. The steering column apparatus for the vehicle of claim 5, wherein the dual folding curling plates are coupled to the upper mounting plate by penetrating through a dual folding curling plate fastening hole formed to the distance brackets.

15. The steering column apparatus for the vehicle of claim 5, wherein the capsule is coupled to the upper mounting plate to be mounted on upper and lower surfaces of the upper mounting plate.

16. A vehicle mounted with the steering column apparatus including the housing assembly and the support assembly according to claim 1, wherein the support assembly is coupled to a side of the housing assembly to absorb the tilt and the impact.

* * * * *